US006991252B2

(12) United States Patent
Enders

(10) Patent No.: US 6,991,252 B2
(45) Date of Patent: Jan. 31, 2006

(54) AIRBAG TO LOAD PLATE ATTACHMENT MECHANISM

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 96 days.

(21) Appl. No.: 10/202,299

(22) Filed: Jul. 24, 2002

(65) Prior Publication Data
US 2004/0017065 A1   Jan. 29, 2004

(51) Int. Cl.
B60R 21/16 (2006.01)
(52) U.S. Cl. ............................. 280/728.1; 280/728.2; 280/732; 280/751
(58) Field of Classification Search ............ 280/728.1, 280/728.2, 732, 751, 752, 730.1, 753, 728.3
See application file for complete search history.

(56) References Cited

U.S. PATENT DOCUMENTS

| 5,062,664 | A | * | 11/1991 | Bishop et al. ............... 280/743 |
| 5,354,093 | A |   | 10/1994 | Schenck et al. ........ 280/728 A |
| 5,538,277 | A |   | 7/1996 | Frary et al. ............... 280/728.2 |
| 5,588,669 | A |   | 12/1996 | Leonard et al. .......... 280/728.3 |
| 5,613,704 | A | * | 3/1997 | White, Jr. et al. .......... 280/740 |
| 5,630,621 | A |   | 5/1997 | Schneider ................... 280/753 |
| 5,676,390 | A | * | 10/1997 | Olson ....................... 280/728.2 |
| 5,692,772 | A | * | 12/1997 | Boxey et al. ............. 280/728.2 |
| 5,816,613 | A |   | 10/1998 | Specht et al. ............... 280/753 |
| 5,845,935 | A | * | 12/1998 | Enders et al. ............ 280/743.2 |
| 5,887,891 | A | * | 3/1999 | Taguchi et al. .......... 280/728.2 |
| 5,931,493 | A |   | 8/1999 | Sutherland ............... 280/730.1 |
| 6,039,380 | A |   | 3/2000 | Heilig et al. .................. 296/70 |
| 6,126,192 | A |   | 10/2000 | Enders .................... 280/728.2 |
| 6,250,665 | B1 | * | 6/2001 | Sutherland et al. ...... 280/728.2 |
| 6,286,858 | B1 | * | 9/2001 | Shepherd et al. ........ 280/728.2 |
| 6,345,838 | B1 | * | 2/2002 | Schneider ............... 280/730.1 |
| 6,431,583 | B1 | * | 8/2002 | Schneider ............... 280/728.2 |

FOREIGN PATENT DOCUMENTS

EP 0684164 12/1998

* cited by examiner

Primary Examiner—Gene O. Crawford
Assistant Examiner—Rashmi Sharma
(74) Attorney, Agent, or Firm—Sally J. Brown

(57) ABSTRACT

A load distributing airbag module having an airbag, a load plate, and a fastener is disclosed. The airbag has an airbag mount and the load plate has a load plate attachment member. The fastener may define a generally enclosed shape to capture the airbag mount and the load plate attachment member. To capture the airbag mount and the load plate attachment member, the fastener has an unfastened and fastened state. In the unfasten state, the fastener may be a "U" shaped channel. In the fastened state, the fastener is generally box shaped.

36 Claims, 3 Drawing Sheets

AIRBAG TO LOAD PLATE ATTACHMENT MECHANISM

BACKGROUND OF THE INVENTION

1. Field of the Invention

The present invention relates to airbags, and more specifically, to an apparatus and method for fastening a load plate to an airbag.

2. Technical Background

The introduction of airbags over the past several decades has prevented numerous deaths and injuries. Some estimates place the number of lives saved by airbags in excess of 10,000 per year. The most common type of airbag is the dashboard mounted airbag. Dashboard mounted airbags may be positioned in the steering wheel or in the dashboard directly in front of the passenger. When a vehicle experiences a sudden deceleration, an inflator rapidly inflates the airbag with a gas. These airbags prevent the occupants from striking the rigid portions of the dashboard.

While such airbags are credited with saving many lives, dashboard mounted airbags do not prevent all injuries that may occur during an automobile accident. In an effort to protect occupants from other areas of a vehicle not protected by a dashboard mounted airbag, multiple airbags and inflatable curtains are being positioned throughout the interior of vehicles. Overhead inflatable curtains and under dashboard knee airbags are now being employed in multiple vehicles to not only save lives but to allow other restraining devices to operate more effectively.

For example, during a front end collision, if the occupant is restrained by a seat belt, the occupant's upper torso bends at the waist and hits the primary airbag. However, depending on the design of the vehicle seat and force of the collision, there is a tendency for an occupant to slide forward along the seat and slip below the primary airbag, falling to the feet and leg compartment of the vehicle. The tendency is pronounced when the occupant is not properly restrained by a seat belt. Sliding of the occupant below the primary airbag is referred to as "submarining." When the occupant submarines, the primary airbag is less effective in protecting the occupant. Submarining is but one example of instances where extra support is needed to protect occupants or goods in an accident situation.

In order to prevent submarining in vehicles, a knee airbag system has been developed. The goal of the knee airbag system is, during an accident, to position a piece of rigid material similar to the material of the instrument panel close to the occupant's knees and legs creating leg and knee support, which prevents submarining. The knee airbag system allows a vehicle manufacturer to design vehicles with more leg room and still have safety comparable to that of vehicles with less leg room. To accomplish the goal, the knee airbag system, when deployed, is typically coupled to an expanding cushion, which positions a portion of the instrument panel in a position to restrict the occupant's forward movement.

Unfortunately, several design concerns must be addressed in order to effectively employ knee airbags. For example, knees may induce two concentrated forces that are focused on a generally small area. When knees impact a typical airbag, the airbag will simply displace the gas within the airbag away from the knees. Thus, despite the presence of an airbag, the occupant's knees may still strike the structure behind the airbag, resulting in injury.

In order to prevent the concentrated force of a knee from displacing the gas in an airbag, force distributing load plates are being attached to airbags. A load plate is a generally rigid plate that is attached to the front of an airbag. When a concentrated force is applied to the load plate, the load plate will transfer that force across the entire airbag. Thus, knees impacting the load plate will be cushioned by the entire airbag.

However, attaching a load plate to an airbag has various design problems. For example, the load plate must remain attached to the airbag as the airbag rapidly inflates. In many airbag systems, the airbag is rapidly inflated by a high pressure gas ejecting from an inflator. The high pressure gas deploys the airbag and the associated load plate toward the occupant. Some airbags propel the load plate at a speed in excess of 100 mph and the, making a secure attachment essential. Such high speeds require an attachment mechanism that can withstand the high forces associated with a rapid acceleration and deceleration.

Furthermore, traditional fasteners such as screws or rivets may not be preferable for knee airbag applications. Drawback to screws and rivets is the number of parts and assembly procedures. Both screws and rivets require two attaching members, which can be difficult to assemble and can also increase the size of the module. Furthermore, rotating a screw numerous times or implementing a rivet gun for each attachment location can be time consuming and increase manufacturing capital expenses.

Therefore, what is needed is a force distributing airbag module that provides a simple attachment mechanism for attaching a load plate to an airbag. The attachment mechanism should be capable of receiving a large impulse force produced by a deploying airbag. The attachment mechanism should also have a limited number of parts and a generally low profile. What is also needed is a method for attaching a load plate to an airbag requiring minimal steps, while maintaining a generally strong attachment. Such apparatuses and methods are disclosed and claimed herein.

BRIEF SUMMARY OF THE INVENTION

The apparatus and method of the present invention have been developed in response to the present state-of-the-art, and, in particular, in response to problems and needs in the art that have not yet been fully resolved by current available airbag systems. Thus, it is an overall objective of the present invention to provide an apparatus and method for maintaining the attachment of a load plate to an airbag.

A force distributing airbag module is comprised of an airbag, a load plate, and a fastener. The airbag has an airbag mount. The load plate, similarly, has a load plate attachment member. The load plate is positionable over the airbag and the load plate and airbag are attached by the fastener.

The fastener is generally comprised of a bent plate that has an unfastened state and a fastened state. In the unfastened state, the fastener may be a generally "U" shaped channel. In the fastened state, the fastener may define a substantially enclosed cross-sectional shape. The fastener is configured to capture the airbag mount and the load plate attachment member, where both members are situated in the substantially enclosed cross-sectional shape. The enclosed shape may be rectangular or boxed shaped, while other applications of the fastener may be varying shapes.

The airbag mount may be a fabric strap fixed at two ends to attach the airbag to the load plate. The load plate attachment member may be defined by two generally parallel slits in the load plate establishing a bridging section. The bridging section is a section of material connected at two opposing ends that is the result of removing two slits of material from the load plate. However, the bridging section may also include a separate piece that is attached to the surface of the load plate, where no holes are present in the load plate or the equivalent.

The fastener may be made of a thin metal strip that is bent into a channel shape. The fastener may have any shape or sizes depending upon the application. One having skill in the art will recognize large range of dimensions possible in the fastener. For example, one fastener embodiment may have a length of about 0.05 inches to about 3 inches, depending on the embodiments. Furthermore, the thickness of the fastener material may be of a range of about 0.02 to 0.06 inches.

Various methods of assembling the airbag to the load plate may be employed. In one method, a fastener is provided which is made of a generally malleable plate. The fastener may be a channel shaped structure. Next, an airbag strap, or other functionally equivalent airbag mount, is inserted into the open channel of the fastener. Then, a load plate attachment member with open slots for accepting the unbend tangs of the fastener is inserted over the fastener tangs. Finally, the fastener is bent to define an enclosed cross-sectional shape where the fastener captures the load plate attachment member and the airbag mount.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–4, where like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the Figures, is not intended to limit the scope of the invention as claimed, but is merely representative of presently preferred embodiments of the invention.

Figure 1:
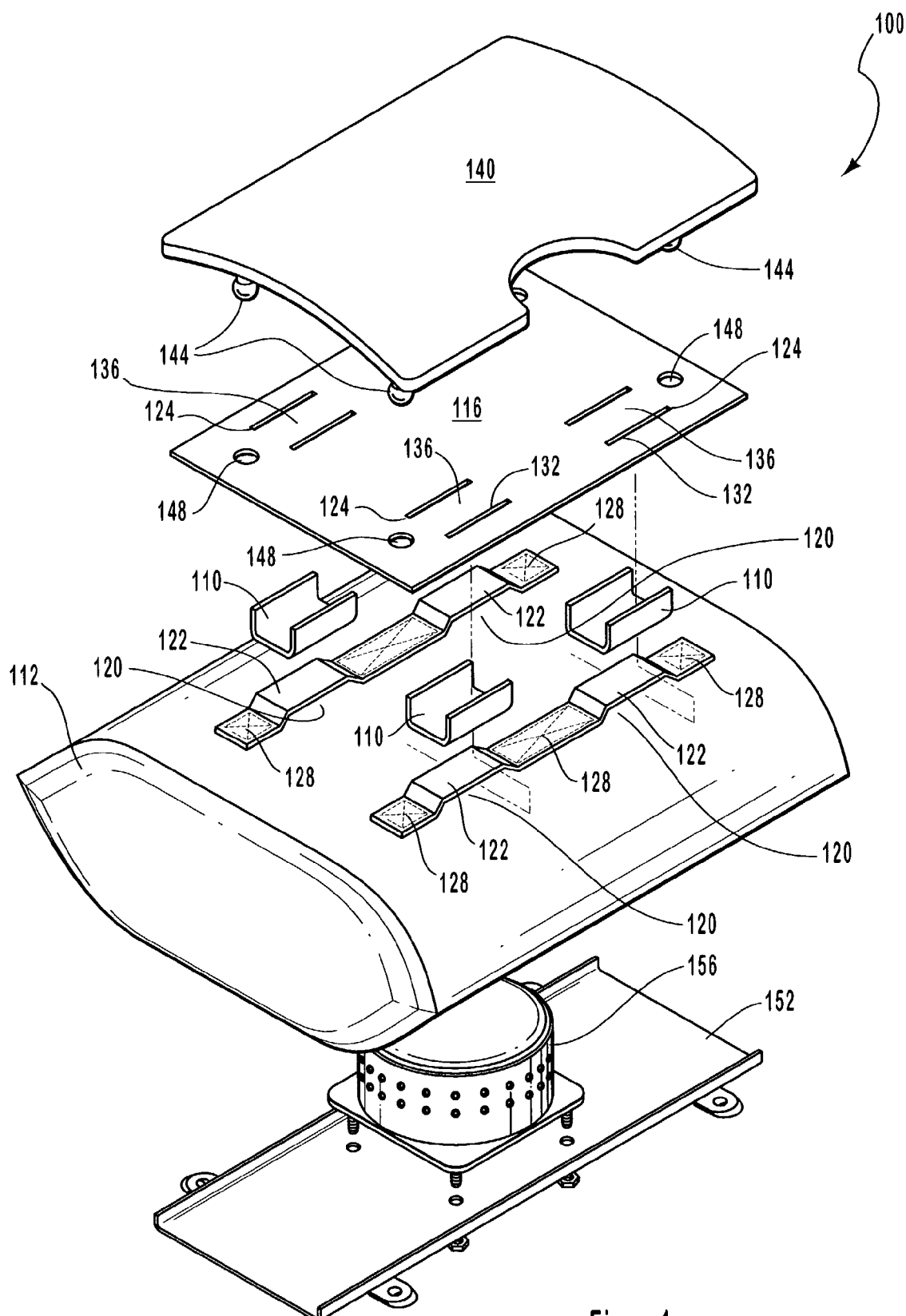
FIG. 1 is an exploded assembly view of the force distributing airbag module.

Referring to FIG. 1, a force distributing airbag module 100 is disclosed. The airbag module 100 is generally comprised of an airbag 112, a load plate 116, and one or more fasteners 110. The fasteners 110 are configured to attach the load plate 116 to the airbag 112. To facilitate attachment, the airbag 112 has one or more airbag mounts 120, and the load plate 116 has one or more load plate attachment members 124.

In the embodiment illustrated in FIG. 1, four fasteners 110 are depicted corresponding to four airbag mounts 120 and four load plate attachment members 124. The fasteners 110 are configured to secure and capture the airbag mounts 120 and the load plate attachment members 124, to couple the load plate 116 to the airbag 112. The fasteners 110 may be comprised of a generally thin metal plate that may be bent to define an enclosed shape. The enclosed shape of the fastener 110 provides a mechanism for capturing the airbag mounts 120 and the load plate attachment members 124. Multiple variations of the fasteners 110 may be incorporated in the airbag module 100, and will be discussed in greater detail later.

In the embodiment illustrated in FIG. 1, the airbag mounts 120 are straps 122 that are attached to the airbag 112. However, the airbag mounts 120 may be any number of configurations, depending upon the airbag 112 and the load plate 116. The straps 122 may be made of the same material as the airbag 112, and are sewn or otherwise attached to the airbag 112. Alternatively, the straps 122 may be an integrally woven section of the airbag 112. Such an integral strap 122 could provide higher strength than could be achieved by a strap 122 that is sewn to the airbag 112. However, integrally weaving the straps 122 of the airbag 112 may increase the complexity of the airbag manufacturing process, thus increasing the cost.

While sewing or weaving the airbag attachment straps 122 to the airbag 112 may be a preferred method of attaching the straps 122 to the airbag 112, other methods and materials may be employed. For example, the straps 122 may be a plastic or metal material that is fastened or stapled to the airbag 112. Another variation may include a metal or plastic strap portion, with two fabric ends 128 that are sewn to the airbag 112. The fabric ends 128 could provide the attachment location for the metal or plastic straps 122.

The straps 122 may also be attached to the airbag 112 by an encompassing member that wraps around the entire airbag 112 or is fastened to a side opposite the side illustrated in FIG. 1. Such an attachment system could wrap around the entire airbag 112 to attach the straps 122 to the airbag 112. However, sewing the straps 122 to the airbag 112 may provide for a generally strong attachment and inexpensive attachment method. Multiple other variations of the airbag mount 120 may exist in order to attach the airbag 112 to the load plate 116. The straps 122 are one embodiment that may be used in the airbag module 100 and are shown for illustrative purposes only. Also, other members that are functionally equivalent to the straps may be employed.

The load plate 116 is a generally rigid member that is configured to receive a force, concentrated in a generally small location, and distribute that force across the entire inflated airbag 112. The load plate 116 is attached to the airbag 112 by one or more fasteners 110. The load plate 116 may be made of a plastic or metal material. The material of the load plate 116 must be of sufficient strength to receive and transfer a force, such as would be produced by knees impacting the load plate 116.

The load plate 116 is illustrated in FIG. 1 as a rectangular member that has an outline that is generally the same size as the outline of the airbag 112. However, the load plate 116 may be any shape that corresponds to the shape of the airbag 112. Alternatively, the shape of the load plate 116 may be selected independently of the shape of the airbag 112. Furthermore, the load plate 116 may have an outline that is larger or smaller than the airbag 112, depending upon the individual application.

The load plate 116 should also be of sufficient size and strength to maintain a plurality of load plate attachment members 124. The load plate attachment members 124, as illustrated in FIG. 1, are defined by a plurality of openings 132 in the load plate 116. In one application, the openings 132 are a pair of parallel slits in the load plate 116 creating a bridging section 136. The slits in the load plate 116 create a structure that is attached to the load plate 116 at two ends, the attachment at two ends create a bridging sections 136. The bridging sections 136 are sized to receive the fasteners 110, such that the fasteners 110 may capture the bridging sections 136.

The bridging sections 136 may be created through features other than openings in the load plate 116. For example, the bridging sections 136 may be a raised strap-type structure that is attached to the load plate 116. Such a raised strap-type structure would not require an opening 132 in the load plate. Furthermore, one having skill in the art would recognize multiple other load plate attachment member 124 may be employed to attach the load plate 116 to the airbag 112.

Once the bridging sections 136 and the straps 122 are captured by the fasteners 110, the load plate 116 is attached to the airbag 112. While the load plate 116 and the airbag 112 are illustrated as having four attachment locations spaced in the four corners of each of the respective members 112, 116, any number of attachment locations and fasteners 110 may be employed.

The load plate 116 and the associated fasteners 110 may be covered by an airbag cover 140. The airbag cover 140 may be a member that attaches to the load plate 116 in order to provide an aesthetic appearance. The airbag cover 140 may be a plastic or metal material that is exposed to the passenger and receives the initial impact from the passenger during deployment. The airbag cover 140 may be padded to prevent injury to the knees or other body parts, such as may occur as the load plate 116 and the airbag cover 140 rapidly accelerate toward the passenger.

The airbag cover 140 may be attached to the load plate 116 through a plurality of snap fit engagements. The snap fits may comprise a plurality of protrusions 144 extending from the airbag cover 140 and engagement holes 148 disposed in the load plate 116. The snap fit engagements may be preferable over other attachment methods, because the protrusions 144 and the engagement holes 148 may be manufactured at the same time as their associated members. However, various other attachment methods may be employed, such as adhesive, traditional screw type fasteners, welding, or other similar methods.

The airbag module 100 may also have a reaction plate 152. The reaction plate 152 maintains and supports an inflator 156 for inflating the airbag 112. The reaction plate 152 may have various holes and geometries in order to attach the airbag 112 to the inflator 156. Furthermore, the shape of the reaction plate 152 will be dependant upon the configuration of the vehicle. The shapes and sizes of the various components of the airbag module 100 should be generally small, such that the airbag module 100 may maintain a low profile.

A low profile may be characterized by the amount of storage space required to maintain the airbag module 100. Because a function of a knee airbag is to prevent "submarining" of the occupant, knee supporting airbags is often placed underneath the dashboard near the occupant's legs. As a result of the modules 100 placement, a large airbag module 100 may restrict the amount of leg room for the occupant. In order to maximize the amount of space for the occupant's legs, the profile or height of the airbag module 100 must be minimized.

Figure 2A:
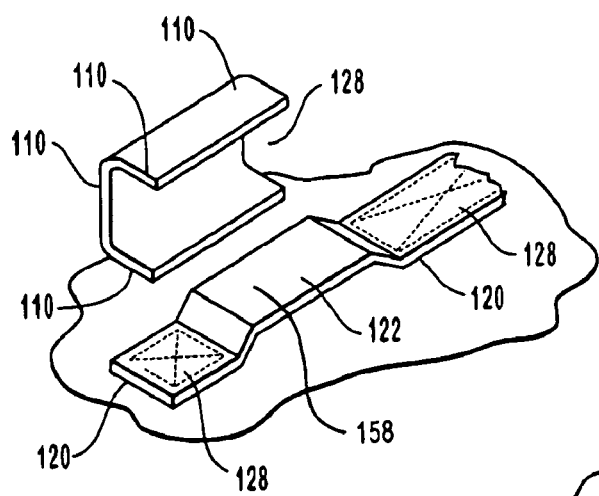
FIG. 2A is a perspective view of a fastener oriented to attach to an airbag mount.

Referring now to FIGS. 2A–D, one process for attaching the fasteners 110 to the load plate 116 and the airbag 112 is illustrated. FIG. 2A illustrates a fastener 110 and a strap 122. The strap 122 is attached to an airbag 112 (not shown) at each end 128. The central portion 158 of the strap 122 is not attached to the airbag 112. The fastener 110, as illustrated, is a generally channel shaped member having a "U" shaped cross-section. The "U" shaped fastener 110 is comprised of a first tang 160 and a second tang 162, which in part define an open upper end 164 and a closed lower end 166.

The cross-sectional shape of the fastener 110 may be created by bending a thin metal plate into the desired shape, such as a "U" shape. While a "U" shaped fastener 110 may be preferred for the embodiment illustrated in FIGS. 1 and 2, various other cross-sectional shapes may be employed. For example, a circular, oval, or polygonal cross-sectional shaped fastener 110 may be used in the airbag module 100. The varying cross-sectional shapes of the fasteners 110 should have an unfastened state and a fastened state. In the unfastened state, the fastener 110 should be capable of receiving the airbag mount 120 and the load plate attachment member 124. In the fastened state, the fastener 110 should be capable of retaining the airbag mount 120 and the load plate attachment member 124.

Figure 2B:
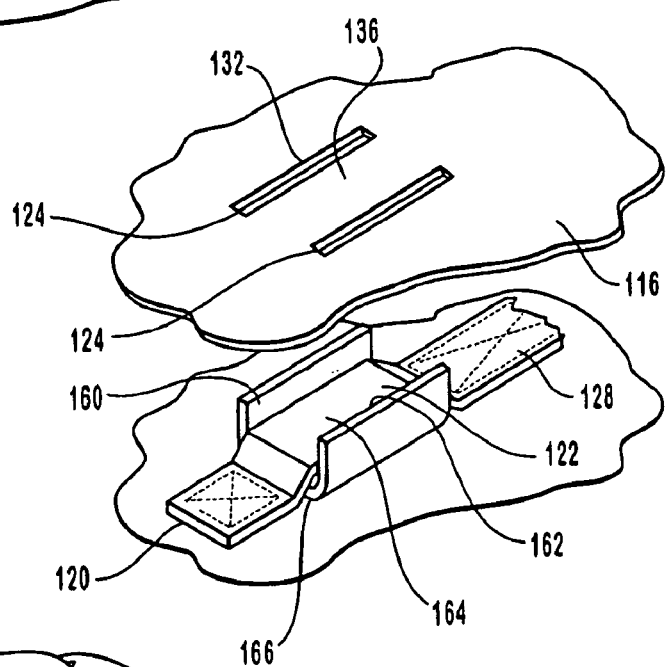
FIG. 2B is a perspective view of an airbag mount positioned within a fastener.

FIG. 2A illustrates a "U" shaped fastener 110 in the unfastened state. To attach the fastener 110 to the airbag mount 120, or strap 122, the fastener 110 may be rotated about 90°, as illustrated in FIG. 2A. The rotation of the fastener 110 allows the fastener 110 to slidably engage the strap 122, such that the strap 122 enters the open upper end 164 of the fastener 110. Once the strap 122 is disposed between the two tangs 160, 162, the fastener 110 may be rotated such that the closed lower end 166 is positioned on the airbag 112, as illustrated in FIG. 2B.

After the airbag mount 120 is placed within the "U" shaped fastener 110, the load plate 116 is positioned over the fastener 110. The load plate attachment member 124 is positioned over the upper open end 164 of the fastener 110. In the load plate attachment member 124 embodiment illustrated in FIG. 2B, a bridging section 136 is defined by two openings 132 in the load plate 116. The openings 132 may be two generally parallel slots. The slots are of sufficient width and length to receive the first tang 160 and second tang 162 of the fastener 110.

However, multiple variations of the load plate attachment members 124 may exist. For example, the load plate attachment member 124 may be created by attaching a bridging section 136 on to the surface of the load plate 116. The bridging section 136 could look similar to the straps 122 employed in the airbag 112. This bridging section 136 could be a metal strap that is welded or adhered to the surface of the load plate 116, so that no slots are required to be placed in the load plate 116. Alternatively, the load plate attachment member 124 may be a cantilevered section defined by a "U" shaped opening in the load plate 116. The cantilevered section would operate similar to the load plate attachment member 124 illustrated in FIG. 2B, except that the attachment member 124 would only be attached to the load plate 116 at one end.

Figure 2C:
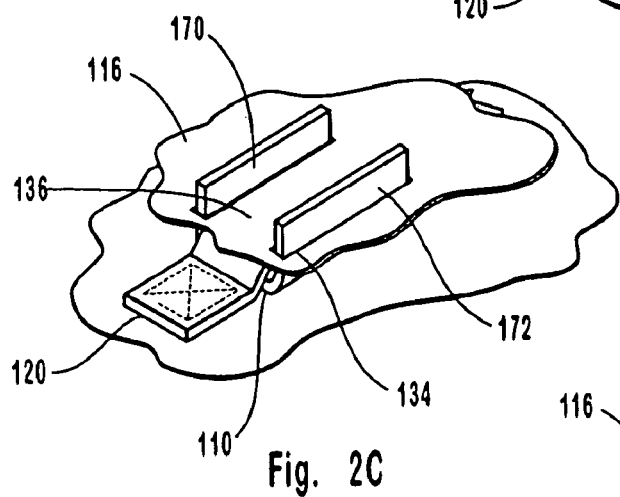
FIG. 2C is a perspective view of an airbag mount and a load plate attachment member positioned to be fastened together.

Referring now to FIG. 2C, after the load plate attachment member 124 is aligned with the fastener 110, the bridging section 136 may be inserted into the upper open end 164 of the fastener 110. Once the strap 122 and the bridging section 136 are positioned within the open channel of the fastener 110, the first tang upper portion 170 and the second tang upper portion 172 will extend out of the load plate 116.

Figure 2D:
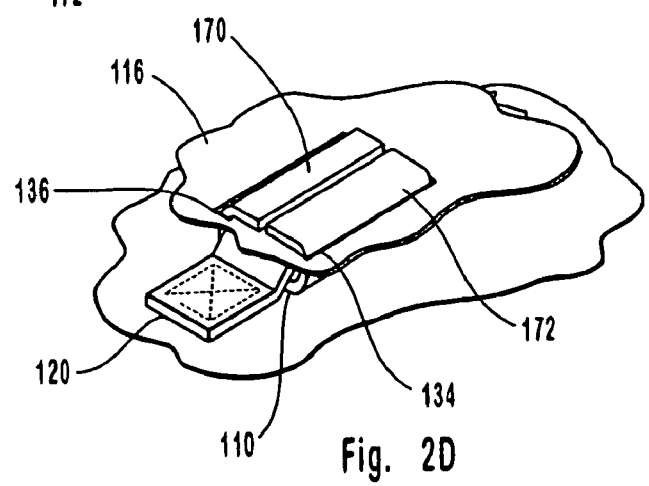
FIG. 2D is a perspective view of an airbag mount and a load plate attachment member fastened together.

Referring now to FIG. 2D, the first tang upper portion 170 and the second tang upper portion 172 are bent to capture the strap 122 and the bridging section 136. The bent fastener 110 illustrated defines the fastened state of the fastener 110. In the fastened state, the cross-section of the fastener 110 may be generally box shaped, where the strap 122 and the bridging section 136 are within the box shape. By bending the first tang upper portion 170 and the second tang upper portion 172, the airbag 112 and the load plate 116 may be attached together.

The fastener 110 may be closed by various methods. One method of fastening the fastener 110 would be to force the tang upper portions 170, 172 against a form, in a manner similar to a stapler. The form would have angled structures that align with the tangs 160, 162 and bend the fastener 110 into the fastened state. Such a form could be created to simultaneously bend multiple fasteners 110 into the fastened state. Thus, closing the fasteners 110 may be accomplished in one step.

Alternatively, the fastener 110 may be fastened through various other methods. These varying methods may depend upon the cross-sectional shape of the fastener 110. For example, a fastener 110 may be provided where the tang upper portions 170 172, are already bent relative to the tangs 160, 162. The tangs 160, 162 could be bent outward from the closed lower end 166 to allow engagement with the airbag mount and load plate attachment member 120, 124. The fastener 110 could then be fastened by applying a lateral pinching type force on the tangs 160, 162 of the fastener 110 to place the fastener 110 in the fastened state.

Other methods of closing the fastener 110 will depend upon the shape of the fastener 110. For example, a fastener 110 may be employed where the tang upper portions 170, 172 of a "U" shape fastener are bent away from each other to create the fastened state. The outwardly bent tang upper portions 170, 172 will engage the load plate 116, preventing the load plate 116 from sliding out of engagement with the fastener 110.

In an embodiment having tang upper portions 170, 172 that bend outward to secure the load plate 116 to the airbag 112, the load plate attachment member 124 and the airbag mount 120 may have various configurations. For example, the load plate attachment member 124 may be a single opening 132 or multiple openings 132 in the load plate 116. For a single opening 132, the fastener 110 would have various tang upper portions 170, 172 that would bend outward to prevent the fastener 110 from pulling out of the opening 132 in the load plate 116. Such a fastener 110 having outwardly bending tang upper portions 170, 172 would be capable of defining a substantially enclosed cross-section. The substantially enclosed cross-section would be defined by the closed lower end 166, the first tang 160 and the second tang 162, even though the upper end 164 remains opened. However, the upper end may be considered closed by a rigid member, such as a load plate 116, being secured near the top of the fastener 110 to prevent the airbag 112 and load plate from separating.

The fastener 110 may also be generally "S" shaped, where one opening of the fastener 110 receives the airbag mount 120 and the other opening receives the load plate attachment member 124. Other fasteners 110 may be substantially "V" shaped. The "V" shaped fastener could receive the load plate attachment member 124 and the airbag mount 120 in an orientation similar to that of FIG. 2A. The "V" shaped fastener would not be rotated, but rather, the fastener would be placed into the fastened state, where the opening in the fastener is facing sideways. However, multiple "V" shaped fasteners oriented in different directions would be required so that the airbag 112 and the load plate 116 do not disengage by sliding the load plate 116 relative to the airbag 112.

Additionally, the size of the fastener 110 may help to maintain the security of the airbag 112 and the load plate 116. The length and thickness of the fastener 110 may be sized to prevent the airbag 112 and the load plate 116 from sliding relative to each other. In one application, the fastener 110 may have a length between about 0.5 inches to 3 inches. Yet, other fasteners 110 may be longer than 3 inches, while other fasteners 110 may be shorter than 0.5 inches, but still having a defined length. Other fasteners may be only slightly shorter than the length of the entire load plate 116.

Depending on the size of the fasteners 110, the openings 132 in the load plate 116 should be sized to receive the tang upper portions 170, 172. The fit between the fastener 110 and the openings 132 in the load plate 116 may be an interference fit or a slip fit. Additionally, the thickness of the fastener 110 should also be considered in defining the size of the openings 132. In one application, the fastener 110 may have a thickness in the range from about 0.02 inches to about 0.06 inches. Yet other fasteners 110 may have thicknesses greater than about 0.06 inches and others have length short than 0.02 inches, while still maintaining a definite thickness.

The thickness of the fastener 110 may depend upon the desired characteristics of the fastener 110. For example, the thicker the fastener 110 material, the larger the force required to bend the fastener 110. While a fastener 110 that is difficult to bend may be desirable to maintain the attachment of the airbag 112 and the load plate 116, such a fastener 110 will also be difficult to close. Therefore, the thickness and other design considerations must be balanced to allow easy attachment as well as a secure hold.

Attaching the load plate 116 to the airbag 112 through the single piece fastener 110 provides several significant benefits. First, the cross-sectional shape of the fastener 110 may be very compact, allowing the overall profile of the airbag module 100 to be decreased. The shape of the fastener 110 can be easily changed to accommodate different profile sizes for different applications. Further, a fastener comprised of a thin bent plate will generally require less space than a screw or rivet. Also, the single piece construction of the fastener 110 will allow the overall part count of the airbag module 100 to be reduced.

An additional benefit of the fastener 110 is the overall engagement area of the fastener 110 with the load plate 116. In a screw or rivet type fastener, the fastener 110 engages only a small section of the load plate 116 that corresponds to the size of the fastener head. The smaller engagement area of the screw or rivet head decreases the force required for the fastener to tear out of the load plate 116. Thus, either more fasteners would be needed or the engagement strength of the airbag 112 and the load plate 116 would be reduced.

However, the bent plate fastener 110 engages the load plate 116 according to the length and width of the fastener 110. The engagement area of the fastener 110 should be equal to the length multiplied by the width of the fastener 110. Conversely, the engagement area of a screw or rivet would only be equal to the area of the head subtracted by the size of the required hole. Thus, the engagement area of the present fastener 110 is substantially larger than previous designs, providing a more secure fit.

Figure 3A:
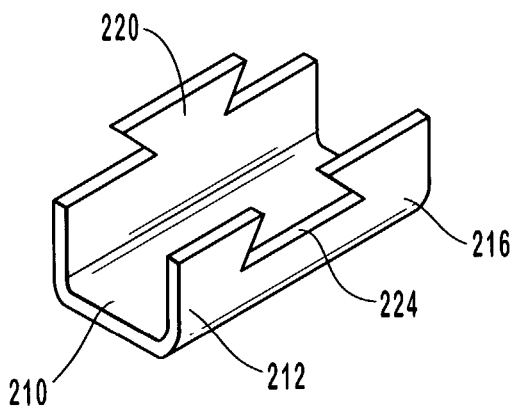
FIG. 3A is a perspective view of a fastener having an interlocking system in an unfastened state.

Referring now to FIGS. 3A and B, another mechanism for securely closing the fastener 210 is illustrated. The fastener 210, similar to the previous fastener 110, has a first tang 212 and a second tang 216. The top portion of the first tang 212 comprises a male end 220 of the dovetail locking configuration. The top portion of the second tang 216 comprises the female end 224 of the dovetail locking configuration.

Figure 3B:
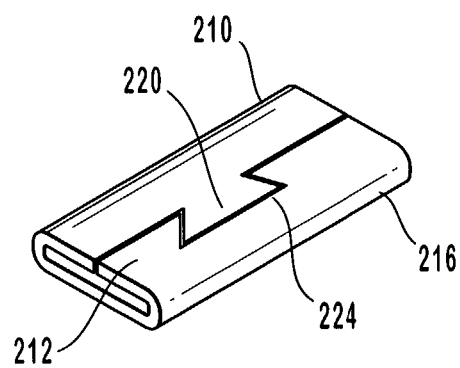
FIG. 3B is a perspective view of a fastener having an interlocking system in a fastened state.

The male and female dovetail ends 220, 224 are shaped such that the two ends 220, 224 interlock when the fastener 210 is in the locked configuration, illustrated in FIG. 3B. Once the two lateral ends 212, 216 are locked together, the male female engagement will prevent the fastener 210 from opening in the presence of a large force on the fastener 210.

Figure 4A:
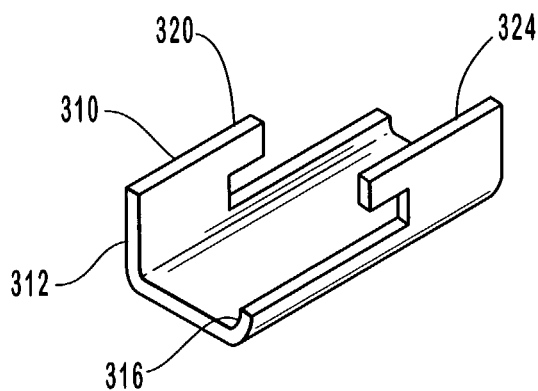
FIG. 4A is a perspective view of another fastener embodiment having an interlocking system in an unfastened state.
Figure 4B:
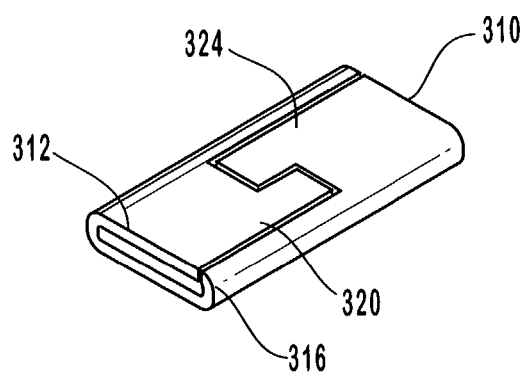
FIG. 4B is a perspective view of another fastener embodiment having an interlocking system in a fastened state.

FIGS. 4A and B illustrate another mechanism of interlocking a first tang 312 and a second tang 316 of a fastener 310. The first tang 312 and the second tang 316 each have an opposing locking structure 320, 324. The fastener 310 maybe be locked in the same manner as the fastener 210 illustrated in FIGS. 3A and B. Once the locking structures 320, 324 are locked together, the fastener 310 will be prevented from bending back into the unfastened state.

Other interlocking mechanisms may be employed to maintain the fasteners 110, 210, 310 in a fastened state. For example, geometries other than the two illustrated in FIGS. 3A and B and FIGS. 4A and B, may be used in the fasteners 110, 210, 310. Furthermore, processes such as welding or applying an adhesive may also be used to secure the fasteners 110, 210, 310 in the fastened state.

While multiple variations of the fastener and the fastening method may be employed in the present invention, the fastener may be generally described as a bent plate that captures an airbag mount and a load plate attachment member. The cross-sectional shape of the bent fastener may vary from polygonal to curvilinear shapes, depending upon the application. Moreover, the process for attaching the load plate to the airbag may be generally described as first providing a channel shaped fastener. The airbag mount and the load plate attachment member are next placed within the channel. Finally, the channel shaped fastener is bent to create a generally enclosed shape, where the airbag mount and the load plate attachment member are positioned within the enclosed shape.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A force distributing airbag module comprising:
    a load plate having a load plate attachment member;
    an airbag having an airbag mount comprising a mounting strap, wherein the load plate is positionable over the airbag; and
    a fastener having at least one plate defining a substantially enclosed cross-section, wherein the substantially enclosed cross-section of the fastener secures the load plate attachment member and the airbag mount.

2. The apparatus, as recited in claim 1, wherein the mounting strap is fixed at two ends to the airbag.

3. The apparatus, as recited in claim 1, wherein the mounting strap is integrally formed to the airbag.

4. The apparatus, as recited in claim 1, wherein load plate attachment member is a bridging section defined by two openings in the load plate.

5. The apparatus, as recited in claim 4, wherein the bridging section is defined by two substantially parallel slits in the load plate.

6. The apparatus, as recited in claim 4, wherein the bridging section is an independent structure attached to the load plate.

7. The apparatus, as recited in claim 1, wherein the fastener is generally elongated.

8. The apparatus, as recited in claim 1, wherein the fastener further comprises an interlocking system.

9. The apparatus, as recited in claim 8, wherein the interlocking system comprises a dovetail configuration.

10. The apparatus, as recited in claim 1, wherein the fastener is from about 0.5 inches to about 3 inches in length.

11. The apparatus, as recited in claim 1, wherein the fastener material thickness is from about 0.02 inches to about 0.06 inches thick.

12. The apparatus, as recited in claim 1, wherein multiple tangs are formed into a single fastener.

13. A process for attaching a load plate to an airbag, wherein the load plate has a load plate attachment member and the airbag has an airbag mount, the process comprising:
    providing a fastener bent to define an open channel;
    inserting the airbag mount into the open channel of the fastener;
    inserting the load plate attachment member into the open channel of the fastener;
    bending the fastener to define a substantially enclosed cross-section, such that the fastener bendably secures the load plate to the airbag.

14. The process, as recited in claim 13, wherein the open channel is generally "U" shaped.

15. The process, as recited in claim 13, wherein the closed channel is generally box shaped.

16. The process, as recited in claim 13, wherein the airbag mount is a strap fixed at two ends to the airbag.

17. The process, as recited in claim 16, wherein the mounting strap is integrally formed to the airbag.

18. The process, as recited in claim 13, wherein the bridging section is defined by two substantially parallel openings in the load plate.

19. The process, as recited in claim 13, wherein the bridging section is an independent structure attached to the load plate.

20. The process, as recited in claim 13, wherein the fastener is generally elongated.

21. The process, as recited in claim 13, wherein bending comprises forcing the open channel against a form to bend the fastener from a substantially open channel to a substantially closed channel.

22. The process, as recited in claim 13, wherein the fastener has a first tang upper portion and a second tang upper portion.

23. The process, as recited in claim 22, wherein first tang upper portion and the second tang upper portion are bent away from each other.

24. The process, as recited in claim 22, wherein bending further comprises interlocking the first tang upper portion of the fastener to the second tang upper portion of the fastener.

25. The process, as recited in claim 22, wherein interlocking is achieved through a dovetail mating shape integrally formed in the fastener.

26. A process for attaching a load plate to an airbag, wherein the load plate has an opening and the airbag has a mounting strap, the process comprising:
   providing a substantially elongated "U" shaped fastener, wherein the "U" shaped fastener has an open upper end an a closed lower end;
   inserting the airbag mounting strap through the open upper end of the "U" shaped fastener to positioned the mounting strap in proximity to the closed lower end, such that the open upper end of the fastener points away from the airbag;
   slidably inserting the upper open end of the "U" shaped fastener through the openings in the load plate;
   bending the upper open ends of the "U" shaped fastener to secure the load plate to the airbag.

27. The process, as recited in claim 26, wherein the bent upper open ends of the "U" shaped fastener create a substantially box shape.

28. The process, as recited in claim 26, wherein bending comprises forcing the open upper ends of the "U" shaped fastener against a contoured structure to induce the bending.

29. The process, as recited in claim 26, wherein the plurality of openings in the load plate are substantially parallel slits.

30. A force distributing airbag module comprising:
   a load plate having a load plate attachment member comprising a bridging section defined by two substantially parallel slits in the load plate;
   an airbag having an airbag mount, wherein the load plate is positionable over the airbag; and
   a fastener having at least one plate defining a substantially enclosed cross-section, wherein the substantially enclosed cross-section of the fastener secures the load plate attachment member and the airbag mount.

31. The apparatus, as recited in claim 30, wherein airbag mount is a mounting strap.

32. The apparatus, as recited in claim 31, wherein the mounting strap is fixed at two ends to the airbag.

33. The apparatus, as recited in claim 31, wherein the mounting strap is integrally formed to the airbag.

34. The apparatus, as recited in claim 30, wherein the fastener is generally elongated.

35. The apparatus, as recited in claim 30, wherein the fastener further comprises an interlocking system.

36. The apparatus, as recited in claim 35, wherein the interlocking system comprises a dovetail configuration.

* * * * *